(12) United States Patent
Seger et al.

(10) Patent No.: US 8,708,138 B2
(45) Date of Patent: Apr. 29, 2014

(54) BELT CONVEYOR EQUIPMENT

(75) Inventors: Martin Seger, Neumarkt (DE); Johann Hüttner, Mallersdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 24 days.

(21) Appl. No.: 12/788,359

(22) Filed: May 27, 2010

(65) Prior Publication Data

US 2010/0300848 A1 Dec. 2, 2010

(30) Foreign Application Priority Data

May 29, 2009 (DE) .......................... 10 2009 023 287

(51) Int. Cl.
*B65G 21/22* (2006.01)

(52) U.S. Cl.
USPC .......................................... 198/842; 198/845

(58) Field of Classification Search
None
See application file for complete search history.

(56) References Cited

U.S. PATENT DOCUMENTS

| | | | |
|---|---|---|---|
| 2,833,390 A | 5/1958 | Greulich | |
| 2,859,861 A | 11/1958 | Sheehan | |
| 3,307,682 A * | 3/1967 | Stone | 198/842 |
| 4,989,723 A * | 2/1991 | Bode et al. | 198/635 |
| 5,083,655 A * | 1/1992 | Becker | 198/460.1 |
| 6,533,101 B2 * | 3/2003 | Bonora et al. | 198/465.1 |
| 6,585,110 B2 * | 7/2003 | Layne et al. | 198/852 |
| 7,131,523 B2 * | 11/2006 | Brixius et al. | 198/465.2 |
| 2003/0019721 A1 | 1/2003 | Greve | |

FOREIGN PATENT DOCUMENTS

| | | |
|---|---|---|
| DE | 6805900 U | 4/1969 |
| DE | 1781252 A1 | 2/1971 |
| DE | 2822196 A1 | 11/1979 |
| DE | 8714840 U1 | 1/1988 |
| DE | 3930626 A1 | 3/1991 |
| DE | 4407163 C1 | 6/1995 |
| DE | 19616907 A1 | 10/1997 |
| DE | 29908943 U1 | 9/1999 |
| DE | 10106190 A1 | 8/2002 |
| DE | 10318621 A1 | 11/2004 |
| DE | 10321736 B3 | 12/2004 |
| DE | 60122305 T2 | 8/2007 |
| DE | 102006053913 A1 | 5/2008 |
| EP | 0939041 A1 | 9/1999 |
| EP | 1477437 A2 | 11/2004 |
| FR | 2280566 A1 | 2/1976 |
| GB | 2163718 A | 3/1986 |
| WO | WO-9211191 A1 | 7/1992 |
| WO | WO-03101865 A1 | 12/2003 |

OTHER PUBLICATIONS

German Search Report for 102009023287.7, mailed on Jan. 14, 2010.
Chinese Office Action for 201010191602.1 dated Jan. 29, 2012.
European Search Report for Application No. 10160045.0, dated Mar. 19, 2013.

* cited by examiner

*Primary Examiner* — Kavel Singh
(74) *Attorney, Agent, or Firm* — Marshall, Gerstein & Borun LLP

(57) ABSTRACT

A belt conveyor that contains a belt body that is provided with at least one running support on which a conveyor belt runs. To achieve a formation with a simple design and a reliable and energy-saving function, the running support has a roller guide and a plurality of rollers are placed one behind the other in the conveying direction between the running support and the conveyor belt.

20 Claims, 6 Drawing Sheets

BELT CONVEYOR EQUIPMENT

CROSS-REFERENCE TO RELATED APPLICATION

The present application claims the benefit of priority of German Application No. 102009023287.7, filed May 29, 2009. The entire text of the priority application is incorporated herein by reference in its entirety.

FIELD OF THE DISCLOSURE

The disclosure relates to a belt conveyor equipment.

BACKGROUND

In the belt conveyors known before now, the conveyor belt slides on a running rail formed as a running support. The running rail is a smooth plate made of, for example, stainless steel, which is optionally coated with an interchangeable wearing surface made of plastic. Nevertheless, it is not possible to avoid the occurrence of a thermal load on the belt body or the conveyor belt due to the sliding friction that necessarily occurs, whereby this thermal load contributes to more rapid wear of these parts on the one hand and also takes up a substantial portion of the driving energy on the other.

Roller conveyors are already known in which the goods to be conveyed run directly on the driven rollers instead of on a belt. The quiet running of these roller conveyors is very restricted, however. These roller conveyors are furthermore only suitable for use with dimensionally larger objects.

A conveyor belt is also known from WO 03/101865 that is put together in the form of a link chain comprising a multiplicity of links, whereby each of these links has a plurality of rollers that are arranged end-to-end in the direction of travel and in rows spaced apart from one another at a right angle to the direction of travel. The links of a link chain are connected to one another by means of joints. The rollers, in turn, run on flat plates, so that no sideward drifting, along with the associated sliding friction, can occur.

SUMMARY OF THE DISCLOSURE

The object of the disclosure is to provide an energy-saving belt conveyor whose design is not very elaborate and that is safe for transport.

As a result of the arrangement according to the disclosure, the sliding friction in known belt conveyors is replaced by rolling friction, which involves greatly reduced energy losses. The thermal load on the structural components is also greatly reduced in this way.

Because the rollers are supported on the running support, it is necessary to provide rollers only at those places at which support of the conveyor belt is actually needed, i.e., at the conveying strand, while the return of the rotating conveyor belt does not require any rollers. Furthermore, as a result of the arrangement according to the disclosure, the roller spacing and the roller diameter can be optimally adapted to the conveyor belt and the goods to be transported, so that both the quiet running of the belt and the quiet running of the goods being transported can be improved.

For example, the roller spacing can be dimensioned in such a way that each link in a link chain lies on at least two rollers.

Rollers can also be provided at the transfer point between two conveyors. If, however, better fixing of the individual link chains and their interspaces as a result of the sliding friction is needed, a transition from the rollers to a known running rail is possible in a simple way at the transfer point between two conveyors. The running rail is preferably to be provided with a wear strip.

If a conveyor is provided, at least in areas, with two conveyor belts running one next to the other, these can rest completely each on its own running support or they can run on shared rollers with their inner edges that face each other.

The rollers preferably do not extend across the entire width of the conveyor belt, but instead two roller guides are provided arranged at a distance from each other.

Regardless of whether for one row or for a plurality of rows of rollers per conveyor belt, the roller guide preferably has a U-shaped cross-section, with the rollers situated in its interior.

The rollers are preferably arranged adjacent to one another as tightly spaced as possible without mutual contact being possible.

It is also possible, however, to support the rollers on the conveyor belt and to use a belt guide for guiding the rollers. Here again the advantage of the replacement of sliding friction with rolling friction is achieved, whereby sideward drifting, and consequently a portion of sliding friction, is avoided by means of the belt guide.

The belt guide preferably contains a guide projection provided between adjacent rows of rollers, whereby this guide projection engages in a guide recess positioned opposite it.

The quiet running is substantially improved by means of the arrangement of at least two rollers at each link of a link conveyor chain.

The development according to the disclosure is particularly suitable in those places in which increased quiet running and the stability of the goods to be conveyed associated with this, in association with low thermal load, are desired. In particular, this is the case when transporting containers, particularly drink containers, empty or filled, and when transporting bundles of these containers.

BRIEF DESCRIPTION OF THE DRAWINGS

Embodiments of the disclosure are explained in more detail in the following, using the drawings. Shown are.

DETAILED DESCRIPTION OF THE PREFERRED EMBODIMENT

Figure 1:
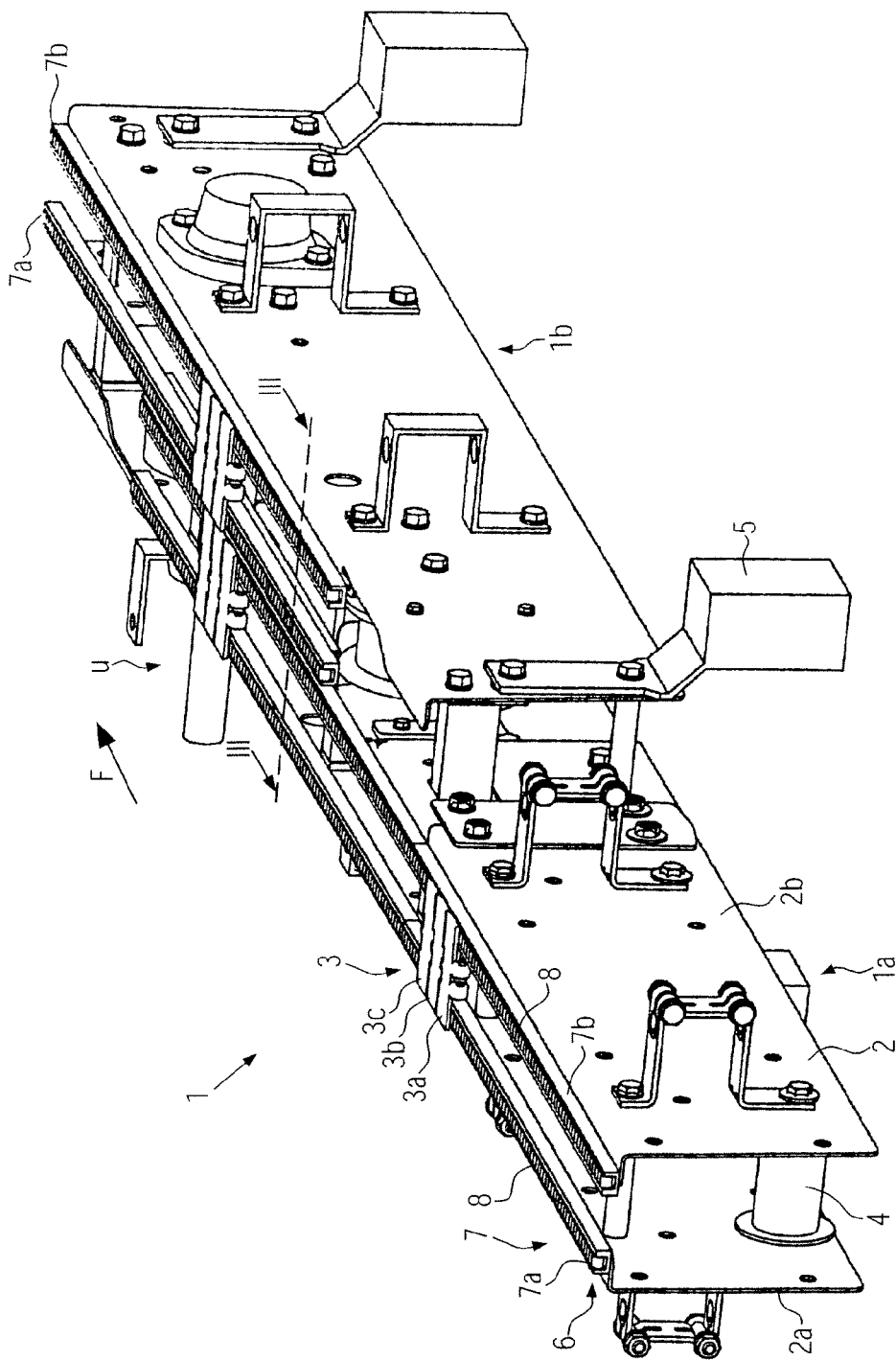
FIG. 1 a perspective depiction of a part of the belt conveyor according to the disclosure, with transfer point, FIG. 2 the side-view of the belt conveyor as shown in FIG. 1, shown enlarged, FIG. 3 the cut from FIG. 1, FIG. 4 a variant of the embodiment as shown in FIG. 3, FIG. 5 a further embodiment of a belt conveyor according to the disclosure, and FIG. 6 a further embodiment of a belt conveyor according to the disclosure.

FIG. 1 is a schematic, perspective depiction of a detail from a conveying strand of a belt conveyor) according to the disclosure, said belt conveyor being particularly suited to the transport of containers, particularly drink containers, filled or empty, and of bundles of, for example, drink containers. The belt conveyor 1 contains a belt body 2 that guarantees the necessary support of a conveyor belt 3. The conveyor belt 3 is formed as a link conveyor chain and is depicted only in the form of individual links 3a, 3b, 3c connected to one another via joints 3'. The belt body 2 contains two side plates 2a and 2c, one lying opposite the other, which are connected to one another and held at a distance to one another via suitable connections 4. The belt body 2 is propped up on the foundation via supports 5.

Figure 2:
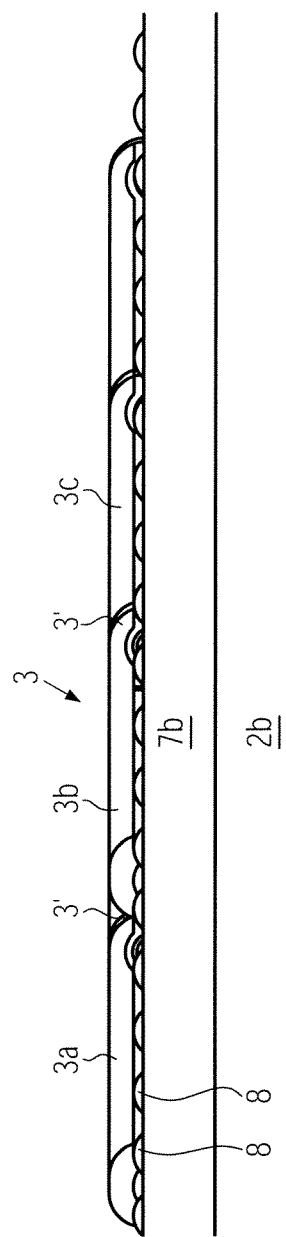

At its upper end, the belt body 2 is provided with a running support 6 on which the conveyor belt 3 is held up on a roller guide 7. In the depicted embodiment, the roller guide 7 contains two roller housings 7a and 7b, which extend across the entire length in the conveying direction F of the belt body 2. To be understood as a roller housing is any structure that is able of supporting rollers 8 in a way that allows them to rotate around an axis running at aright angle to the conveying direction and that secures them against lateral (i.e., at aright angle to the conveying direction) drifting, whereby in the depicted embodiment, a plurality of individual rollers 8 is mounted in each roller housing 7a, 7b in a manner that allows rotation. The roller housings 7a, 7b are formed with a U-shaped cross-section and are arranged with their openings pointing upwards, and each contains a row of individual rollers 8 (preferably made of plastic), which in the depicted embodiment are so closely adjacent to one another (see also FIG. 2) as is possible without mutual contact of the rollers 8. Furthermore, the roller diameter and the distance between rollers should be dimensioned in such a way that each link 3a, 3b, 3c, etc. rests on at least two rollers. In the depicted embodiment, each link 3a, 3b, 3c rests with each of its side, free edges on five to six rollers 8. At the same time, the side, free edges of the links 3a, 3b, 3c, etc. lie directly on the rollers 8, i.e., without wearing strips or the like being placed in between.

Figure 3:
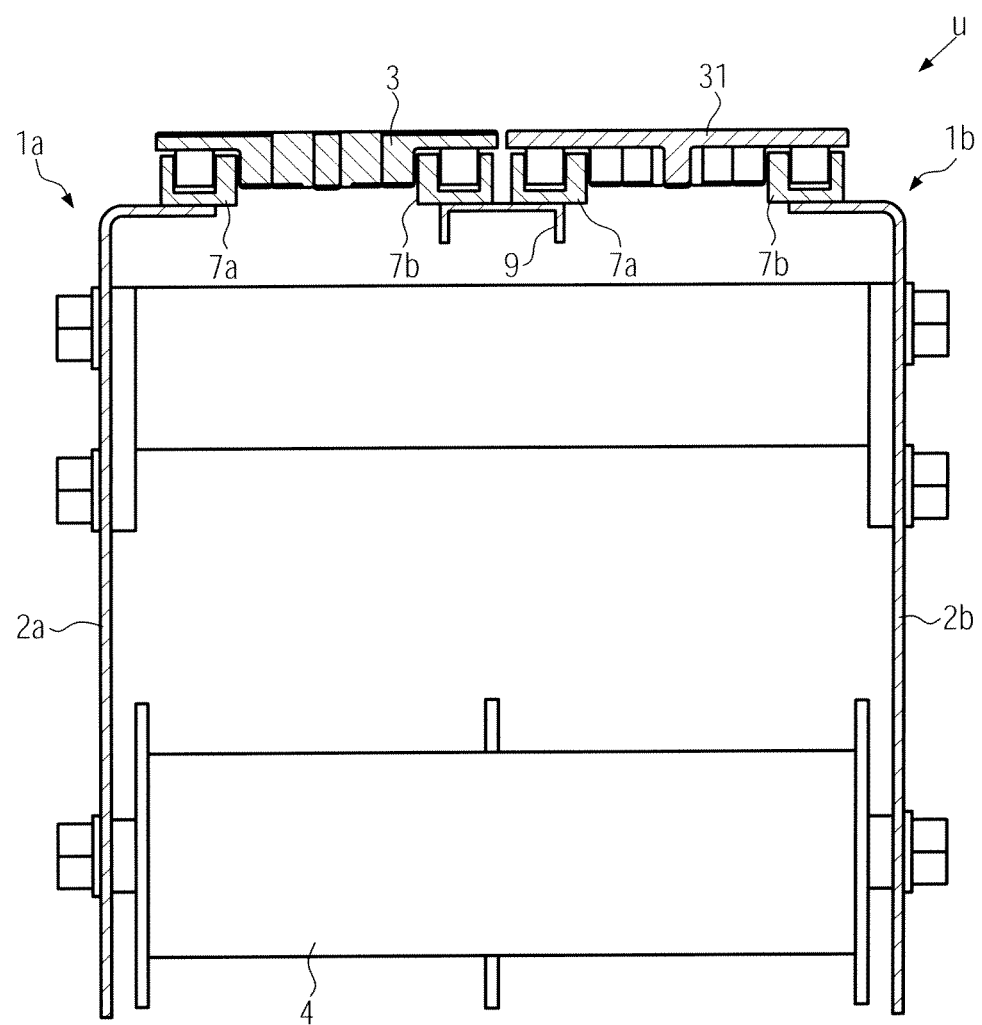
Figure 4:
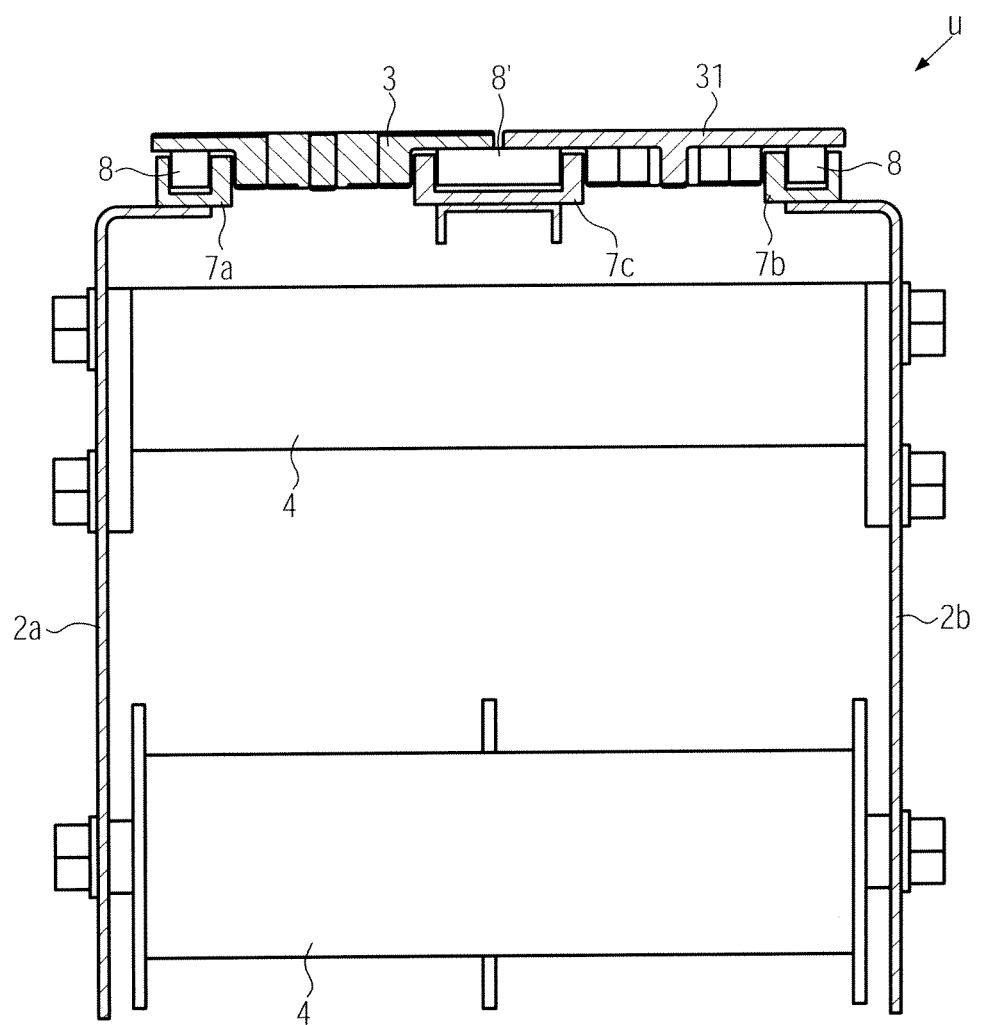

In FIG. 1, the belt conveyor 1 according to the disclosure is shown at a transfer point U, at which the objects coming in the conveying direction F on a first belt conveyor unit 1a are passed on to a second belt conveyor unit 1b. In the depicted embodiment, both belt conveyor units 1a, 1b are formed identically, are arranged parallel to each other and, including the transfer point U, are provided with the rollers 8. The two belt conveyor units 1a, 1b overlap at the transfer point U in the conveying direction F, so that in the area of the transfer point U, the rollers 8 of the roller housing 7b of the belt conveyor unit 1a run directly next to the rollers 8 of the roller housing 7a, as is shown in more detail in the sectional representation according to FIG. 3.

A first conveyor belt 3 runs on the belt conveyor unit 1a and a second conveyor belt 31 runs on the second belt conveyor unit 1b. The two conveyor belts 3, 31 are formed identically as link chain belts. In the area of the transfer point U, however, the side plate 2b of the belt conveyor unit 1a and the side plate 2a of the belt conveyor unit 1b are replaced by a support rail 9, on which the two adjacent roller housings 7b, 7a are arranged. In the area of the transfer point U, the supports 4 take over the connection of the side plate 2a of the first belt conveyor unit 1a to the side plate 2b of the second belt conveyor unit 2b.

In the area of the transfer point U or at other points at which the conveying job is to be fulfilled by two conveyor belts 3, 31 lying adjacent to each other, it is, however, also possible to hold up the two inner edges of the conveyor belts 3, 31 that lie adjacent to each other on shared rollers 8', said two inner edges facing each other. The shared rollers 8' are, however, like the rollers 8, held in a roller housing 7c with U-shaped cross-section in such a way that they can rotate, whereby the diameter and the distance between the rollers 8' are formed in a manner similar to that for the rollers 8.

Figure 5:
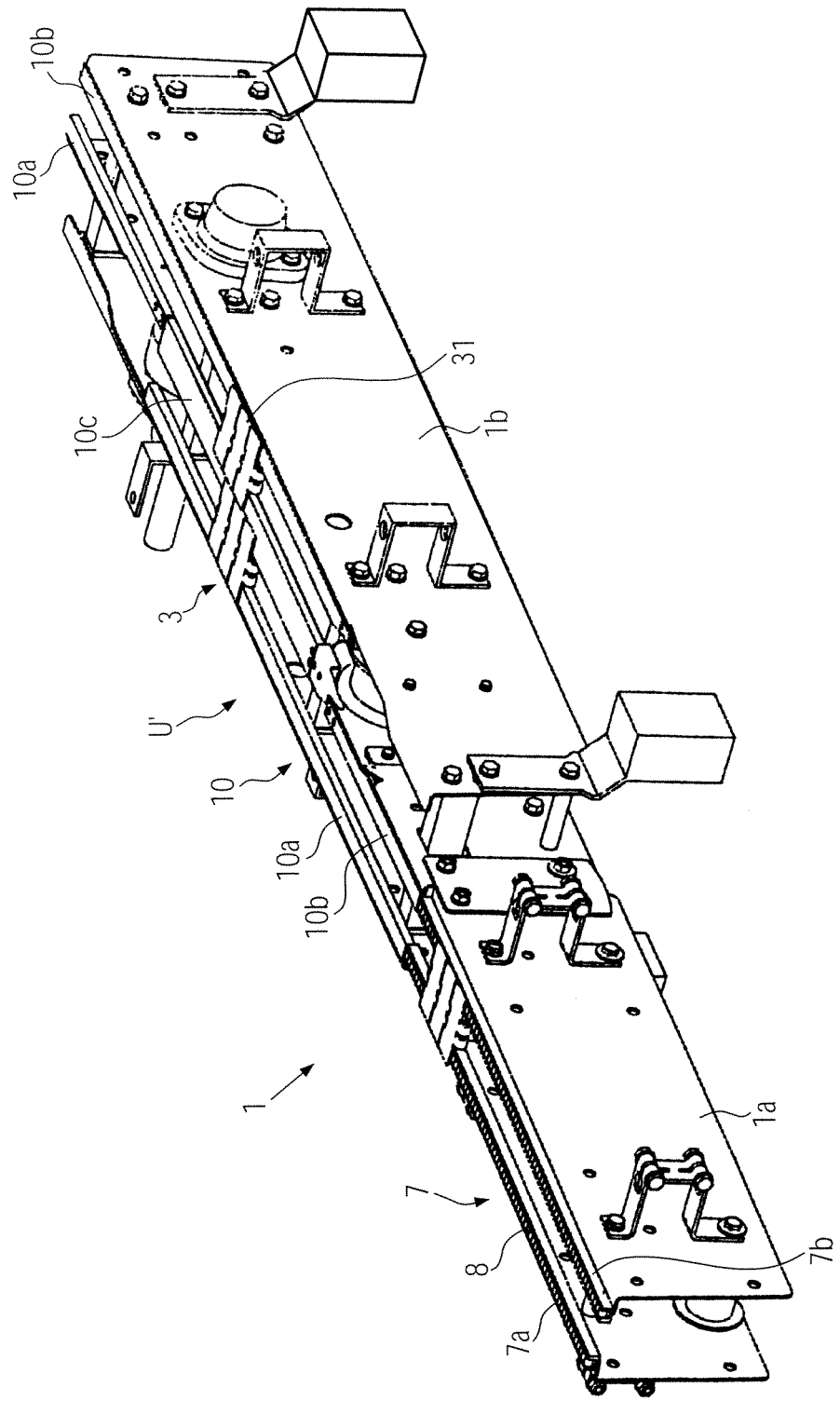

As FIG. 5 shows, the transfer point U' between a first belt conveyor unit 1a and a second belt conveyor unit 1b of the belt conveyor 1 can, however, also be effected via the conventional sliding rails 10 formed for sliding friction, whereby said sliding rails 10 replace the rollers in the area of the transfer point U' and, where applicable, are provided with customary wear strips. Like in the first embodiment, here each belt conveyor unit 1a, 1b contains two roller housings 7a, 7b, in the U-shaped cross-section of which the rollers 8 are held in such a way that they jut out to the top from the cross-section. The thickness and arrangement of the sliding rails 10 should be coordinated to the projecting length of the rollers 8 in such a way that a transition between the rollers and the sliding rails 10 is possible without jerking. The sliding rails 10 extend a certain distance before and after the transfer point U', whereby a separate sliding rail 10a, 10b is provided here for each roller housing 7a, 7b. In the area of the transfer point U', the adjoining sliding rails 10b of the belt conveyor unit 1a and 10a of the belt conveyor unit 1b are replaced by a shared sliding rail 10c, on which the inner free edges of the two adjacent conveyor belts 3, 31 rest, said edges facing each other.

Figure 6:
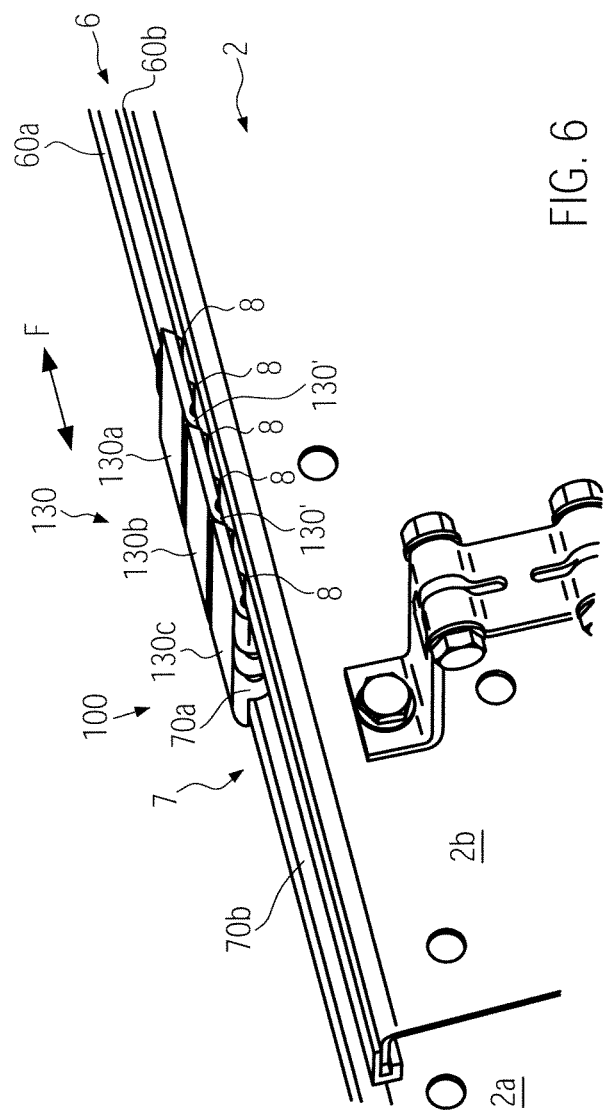

FIG. 6 shows a further embodiment of a belt conveyor 100 according to the disclosure, whereby this differs from the embodiment according to the preceding figures in that there is a modified roller guide 7. Components that are the same or comparable are identified with the same reference numbers and are not explained again. As a result, the belt conveyor 100 contains a belt body 2 with opposing side plates 2a, 2b, that are provided with the running support 6 at their upper end. In the depicted embodiment, the running support 6 contains two running rails 60a and 60b that are parallel and that lie next to each other horizontally at a distance from each other, and that are formed as flat, straight, strip-like plates that extend in the conveying direction F. Rollers 8, which are supported on a conveyor belt 130 in such a manner that they can rotate, run on the running rails 60a, 60b. The rollers 8 are supported on the individual links (shown are only three links 130a, 130b, 130c, which are connected to one another via the joints 130') in such a manner that they can rotate around an axis running at aright angle to the conveying direction F, and protrude downwards in the direction toward the running rails 60a, 60b. In the depicted embodiment, a separate row of rollers 8 which extends in the conveying direction F is provided for each of the running rails 60a, 60b at the link chain 130, whereby each of the links 130a, 130b, 130c preferably has at least two rollers, one behind the other in the conveying direction F. The rollers 8 roll freely on each of the assigned running rails 60a, 60b.

The roller guide 7 for securing the rollers 8 against sideward drifting at a right angle to the conveying direction F contains a combination of a guide projection 70a and a guide recess 70b that are arranged one above the other and that are in guiding engagement with each other. In the depicted embodiment, the guide projection 70a is provided on the link chain 130 and the guide recess 70b is provided on the running support 6. The recess 70b is formed by the distance between the two running surfaces 60a, 60b, while the guide projection 70a protrudes downwards from the link chain 130 over the rollers 8 and is preferably provided in the area of the joints 130', where its manufacture can be solved in a relatively simple manner. In the depicted embodiment, a guide projection 70a is provided on each link 130a, 130b, 130c, but it is also possible to provide only selected links with the guide projection 70a.

In modification of the described and drawn embodiments, the development according to the disclosure can be used in belt conveyors and conveyor belts of all kinds. For example, only one row of rollers per belt conveyor or more than two rows can be used. The design of the belt body can also be solved in a modified manner. Finally, the diameters of the rollers and the distances between them can be selected according to the conveying job. The return of the conveyor belt can be executed in any manner. The belt guide can also have a projection on the running support with a recess on the belt.

The invention claimed is:

1. Belt conveyor, comprising a conveyor belt running on a belt body, the belt body comprising at least one running support, wherein the running support contains a roller guide attached to the running support, the roller guide is formed as a roller housing that mounts a plurality of rollers positioned one behind the other in the conveying direction (F), the roller housing having an opening pointing upward, wherein the rollers are mounted in the roller housing in such a manner, that they can rotate, and wherein the rollers are provided at a conveying strand to support the conveyor belt,
the conveyor belt comprising a link conveyor chain that runs on the rollers and
wherein the distance between the rollers being dimensioned in such a way that each link of the link conveyor chain in the transport position is supported by at least two rollers along the conveying direction.

2. Belt conveyor according to claim 1, wherein the running support is also provided with the rollers at a transfer point (U) between two belt conveyor units, wherein at the transfer point (U) the objects coming in the conveying direction (F) on a first belt conveyor are passed on to a second belt conveyor.

3. Belt conveyor according to claim 1, wherein at a transfer point (U'), at which the objects coming in the conveying direction (F) on a first belt conveyor are passed on to a second belt conveyor, between-the first and second belt conveyor units, the running support is provided with a sliding rail on which the link conveyor chain runs.

4. Belt conveyor according to claim 3, wherein the sliding rail is provided with a wear strip.

5. Belt conveyor according to claim 1, wherein at a transfer point (U'), at which the objects coming in the conveying direction (F) on a first belt conveyor are passed on to a second belt conveyor, wherein in the case of the first and the second link conveyor chains running next to each other, the inner edges of the two link conveyor chains run on one of a shared roller and a shared sliding rail.

6. Belt conveyor according to claim 1, wherein the roller housing is formed with a U-shaped cross-section, in the interior of which the rollers are held in such a manner that they can rotate.

7. Belt conveyor according to claim 1, wherein the running support has two roller housings that are arranged at a distance from each other and parallel to each other.

8. Belt conveyor according to claim 1, wherein the rollers are arranged adjacent to one another and tightly spaced.

9. Belt conveyor according to claim 1, wherein the belt conveyor is developed as a container transport device.

10. Belt conveyor according to claim 1, wherein he belt conveyor is developed as a bundle transport device.

11. Belt conveyor, comprising a conveyor belt running on a belt body, the belt body comprising at least one running support, wherein the running support contains a roller guide attached to the running support, the roller guide is formed as a roller construction that contains a plurality of rollers positioned one behind the other in the conveying direction (F), the roller construction having an opening pointing upward, wherein each roller can rotate about its axis, and the wherein the rollers are provided at a conveying strand to support the conveyor belt,
the conveyor belt comprising a link conveyor chain that runs on the rollers and
wherein the distance between the rollers being dimensioned in such a way that each link of the link conveyor chain in the transport position is supported by at least two rollers along the conveying direction.

12. Belt conveyor, comprising a conveyor belt running on a belt body, the belt body comprising at least one side plate provided with at least one running support, wherein the running support contains a roller guide attached to the running support, the roller guide is formed as a roller housing that mounts a plurality of rollers positioned one behind the other in the conveying direction (F), wherein the rollers are mounted in the roller housing in such a manner, that they can rotate, and wherein the rollers are provided at a conveying strand to support the conveyor belt,
the conveyor belt comprising a link conveyor chain that runs on the rollers and
wherein the distance between the rollers being dimensioned in such a way that each link of the link conveyor chain in the transport position is supported by at least two rollers along the conveying direction.

13. Belt conveyor according to claim 12, wherein the running support is also provided with the rollers at a transfer point (U) between two belt conveyor units, wherein at the transfer point (U) the objects coming in the conveying direction (F) on a first belt conveyor are passed on to a second belt conveyor.

14. Belt conveyor according to claim 12, wherein at a transfer point (U'), at which the objects coming in the conveying direction (F) on a first belt conveyor are passed on to a second belt conveyor, between the first and the second belt conveyor units, the running support, is provided with a sliding rail on which the link conveyor chain runs.

15. Belt conveyor according to claim 14, wherein the sliding rail is provided with a wear strip.

16. Belt conveyor according to claim 12, wherein at a transfer point (U'), at which the objects coming in the conveying direction (F) on a first belt conveyor are passed on to a second belt conveyor, wherein in the case of the first and the second link conveyor chains running next to each other, the inner edges of the two link conveyor chains run on one of a shared roller and a shared sliding rail.

17. Belt conveyor according to claim 12, wherein the roller housing is formed with a U-shaped cross-section, in the interior of which the rollers are held in such a manner that they can rotate.

18. Belt conveyor according to claim 12, wherein the rollers are arranged adjacent to one another and tightly spaced.

19. Belt conveyor according to claim 12, wherein the belt conveyor is developed as a bundle transport device.

20. Belt conveyor, comprising a conveyor belt running on a belt body comprising at least one side plate provided with at least one running support, wherein the running support contains a roller guide attached to the running support, the roller guide is formed as a roller construction that contains a plurality of rollers positioned one behind the other in the conveying direction (F), wherein each roller can rotate about its axis, and wherein the rollers are provided at a conveying strand to support the conveyor belt,
the conveyor belt comprising a link conveyor chain that runs on the rollers and
wherein the distance between the rollers being dimensioned in such a way that each link of the link conveyor chain in the transport position is supported by at least two rollers along the conveying direction.

* * * * *